United States Patent
Yamamoto

(10) Patent No.: US 7,207,235 B2
(45) Date of Patent: Apr. 24, 2007

(54) BALL SCREW MECHANISM AND ELECTRIC POWER STEERING APPARATUS USING SUCH MECHANISM

(75) Inventor: Yasuharu Yamamoto, Toyota (JP)

(73) Assignee: Toyoda Koki Kabushiki Kaisha, Kariya-shi (JP)

( * ) Notice: Subject to any disclaimer, the term of this patent is extended or adjusted under 35 U.S.C. 154(b) by 261 days.

(21) Appl. No.: 10/421,792

(22) Filed: Apr. 24, 2003

(65) Prior Publication Data

US 2004/0020317 A1 Feb. 5, 2004

(30) Foreign Application Priority Data

Apr. 24, 2002 (JP) .............................. 2002-122689

(51) Int. Cl.
*F16H 25/22* (2006.01)
(52) U.S. Cl. ................................. 74/424.88; 74/424.82
(58) Field of Classification Search ............. 74/424.88, 74/424.82
See application file for complete search history.

(56) References Cited

U.S. PATENT DOCUMENTS

| | | | | |
|---|---|---|---|---|
| 5,927,858 | A | * | 7/1999 | Agari .......................... 384/45 |
| 6,095,009 | A | * | 8/2000 | Takagi ...................... 74/424.88 |
| 6,176,149 | B1 | * | 1/2001 | Misu ........................ 74/424.82 |
| 6,347,558 | B1 | | 2/2002 | Miyaguchi et al. |
| 6,415,676 | B1 | * | 7/2002 | Takagi et al. ............. 74/424.88 |
| 2003/0221501 | A1 | * | 12/2003 | Ohkubo et al. .......... 74/424.88 |

FOREIGN PATENT DOCUMENTS

| | | | |
|---|---|---|---|
| DE | 26 27 025 | * | 12/1977 |
| DE | 42 35 842 | * | 4/1994 |
| EP | 1 026 067 | | 8/2000 |
| JP | 10-281154 | | 10/1998 |
| JP | 11-037246 | | 12/1999 |
| JP | 2000-120825 | | 4/2000 |
| JP | 2000-199556 | | 7/2000 |
| JP | 2000-355278 | | 12/2000 |
| JP | 2001-132811 | | 5/2001 |
| JP | 2002-019625 | | 1/2002 |
| JP | 59-43717 | | 3/2006 |

* cited by examiner

*Primary Examiner*—William C. Joyce
(74) *Attorney, Agent, or Firm*—Oblon, Spivak, McClelland, Maier & Neustadt, P.C.

(57) ABSTRACT

An electric power steering apparatus comprises a rack-and-pinion mechanism and a ball screw mechanism. The ball screw mechanism comprises a shaft formed a screw groove and a nut formed a screw groove. A ball-roll path is created spirally by the screw grooves of the shaft and the nut being opposite each other. A plural number of balls are contained into the ball-roll path. A ball-return path is connecting both ends of the ball-roll path so that the balls go through. A circulation path consists of the ball-roll path and the ball-return path, in which the balls move endlessly. A plural number of separators is arranged between the balls respectively in order to prevent balls from contacting each other. A number of the balls is fewer from one ball to three balls than a maximum number of the balls which can be contained into the circulation path.

5 Claims, 9 Drawing Sheets

BALL SCREW MECHANISM AND ELECTRIC POWER STEERING APPARATUS USING SUCH MECHANISM

INCORPORATION BY REFERENCE

The present application claims priority under 35 U.S.C. §119 to Japanese Patent Application No. 2002-122689, filed on Apr. 24, 2002. The contents of that application are incorporated herein by reference in their entirety.

BACKGROUND OF THE INVENTION

1. Field of the Invention

This invention relates to a ball screw mechanism to transform form rotational/linear movement to linear/rotational movement and, an electric power steering apparatus using such ball screw mechanism.

2. Discussion of the Background

A ball screw mechanism that transforms rotational movement into linear movement is used for an electric power steering apparatus in order to transmit assist power of the electric motor to a rack shaft that is disposed between right and left wheels so as to steer the wheels by movement thereof in its axial direction. Such ball screw mechanism consists of a screw shaft which a thread groove is formed on its outside surface, a nut which a thread groove is formed on its inside surface and plural balls which exist between the thread grooves. More particularly, the balls are disposed to be able to roll with receiving road into a spiral ball-roll path that is created by opposing the thread groove of the screw shaft and the thread groove of the nut each other. A ball-return path to cycle the balls endlessly is formed into the nut. When the nut is rotated, rotational force of the nut is smoothly transformed into force that moves the screw shaft in its axial direction by the balls being cycled endlessly through the ball-roll path and the ball-return path according to the rotation of the nut. As a result the screw shaft is moved in its axial direction. Similarly, when the screw shaft is rotated, the nut is moved in its axial direction, and when one of the screw shaft and the nut is moved in its axial direction, the other is rotated.

As the ball-return path formed into the nut, for example, a construction using a return tube that connects both ends of a thread groove of a nut, and a construction that thread grooves formed into each end cap are connected by a ball-return path that is formed into a nut along its axial direction are known. A deflector-type ball-return path is adapted for the electric power steering apparatus. That is, a deflector that a passage, which a ball can pass, is formed into is attached into a through hole which goes through a nut in its radial direction so as to carve a part of a thread groove out. Therefore, the deflector and the part of the thread groove that is cut off create a ball-return path by attaching the deflector to the through hole. A ball screw mechanism using the deflector-type return-path has plural deflectors which are arranged to depart from each other with same distance in both of the axial direction and the circumference direction. Plural ball-roll paths that the balls are endlessly cycled in are created, which a number of ball-roll paths is same as the number of the deflectors. Length of the ball-roll path is equivalent with one round of spiral in this ball screw mechanism, because of characteristic of the ball-return path. Since the weight of the nut is balanced, this ball screw mechanism is suitable for the electric power steering apparatus that the screw shaft is made a rack shaft of the electric power steering apparatus and that the nut is turned by an electric motor.

When the nut is rotated for the screw shaft relatively, the balls endlessly move along the ball-roll path as the balls roll themselves. Then, because the balls contact to the next ball each other, frictional force that disturbs the rolling of the balls occurs at the contacting point of each ball. The frictional force not only disturbs the operation of the ball screw mechanism but also causes generation of noise and deterioration of lifetime. Meanwhile, each ball undertakes load in the ball screw mechanism. Generally, it is preferable that number of the balls is many, because load capacity of the ball screw mechanism becomes large. Therefore, it is preferable that distance between balls next to each other is short in order to arrange many balls.

According to the foregoing, a ball screw mechanism that separators are arranged between each balls to prevent contacts of balls and to keep distances between the balls short is known (for example, by Japanese Laid-Open Patent Application No. 2000-120825 and No. 2000-199556). The separator is a ring-shape or a disk-shape whose diameter is smaller than the same of the ball. A concavity that a part of the ball fits into is formed on each end face of the separator so that the part of the ball next to each other is slidably fitted into. As a result, the separators are held by the balls next to each other. Small clearance is configured between each ball and each separator in this state. The clearance is decided to be satisfied that the balls are permitted to roll properly and prevented to slide for the separator unnecessarily and that the separator that is assembled last can be assembled between the ball which was assembled first and the ball which was assembled last. Therefore, each separator is held by balls next to each other so as to keep the clearances, does not fall down, and moves together with the ball along the ball-roll path.

However, at the above-described ball screw mechanism, there are dispersions of lengths of the ball-roll paths, because of manufacturing error. Several kind of separator whose widths are different each other are prepared and selectively used for adjusting the clearances between the balls and the separators. Therefore, the parts management of the separator is complicated. Further, a process that selects suitable separator must be added in assembling the ball screw mechanism. Especially, since the ball screw mechanism using the deflector-type return-path has plural ball-roll paths, the adjustment of the clearance is needed for each ball-roll paths.

At the ball screw mechanism using the separator, it is possible that the separator catch on a seam between the ball-roll path and the ball-return path or on a portion that the direction of the ball-roll path changes. This causes torque non-uniformity and the balls being blocked up. It is remarkable at the ball screw mechanism using the deflector-type return-path, because a gap is easily created at a seam between the ball-roll path and the ball-return path. As a provision, separators whose periphery surface is formed spherically in order to avoid being caught in are known by the aforementioned Japanese Laid-Open Patent Application No. 2000-120825. However, it is difficult to machine the separator spherically, because the separators are extremely small parts.

Therefore, the electric power steering apparatus that adopted the above-described conventional ball screw mechanism becomes a high cost because of the complicated parts management and the extra assembling process. In addition, there is a problem that it is possible that operation failures of the electric power steering apparatus happen because of the torque non-uniformity or the ball being blocked.

SUMMARY OF THE INVENTION

In view of the foregoing, it is an object of the present invention to provide improved ball screw mechanisms and an electric power steering apparatus. In order to achieve the above and other objects, as a first aspect of the present invention, a ball screw mechanism that transforms from rotational movement into linear movement and from linear movement into rotational movement comprises a shaft formed a screw groove on an outer surface thereof and a nut formed a screw groove on an inner surface thereof. A ball-roll path is created spirally by the screw groove of the shaft and the screw groove of the nut being opposite each other. A plural number of balls are contained into the ball-roll path. A ball-return path is connecting both ends of the ball-roll path so that the balls go through. A circulation path consists of the ball-roll path and the ball-return path, in which the balls move endlessly. A plural number of separators is arranged between the balls respectively in order to prevent balls from contacting each other. A number of the balls is fewer from one ball to three balls than a maximum number of the balls which can be contained into the circulation path.

As a second aspect of the present invention, another ball screw mechanism that transforms from rotational movement into linear movement and from linear movement into rotational movement comprises a shaft formed a screw groove on an outer surface thereof and a nut formed a screw groove on an inner surface thereof. A ball-roll path is created spirally by the screw groove of the shaft and the screw groove of the nut being opposite each other. A plural number of balls are contained into the ball-roll path. A ball-return path is connecting both ends of the ball-roll path so that the balls go through. A circulation path consists of the ball-roll path and the ball-return path, in which the balls move endlessly. A plural number of separators is arranged between the balls respectively in order to prevent balls from contacting each other. An outer surface of each separator is chamfered so that a proportion of a maximum diameter at the center of the axial direction of the separator and a minimum diameter at the ends of the axial direction of the separator is in a range from 0.8 to 0.9.

As a third aspect of the present invention, an electric power steering apparatus to generate assist power according to steering torque comprises a shaft, a pinion, an electric motor and a nut. The shaft is formed a rack on a part thereof and a screw groove on another part thereof, respectively. The pinion is engaged with the rack shaft, which the steering torque is inputted in. The electric motor is controlled to generate the assist power according to the steering torque. The nut is formed a screw groove on an inner surface thereof, which is rotated by the electric motor. A ball-roll path is created spirally by the screw groove of the shaft and the screw groove of the nut being opposite each other. A plural number of balls are contained into the ball-roll path. A ball-return path is connecting both ends of the ball-roll path so that the balls go through. A circulation path consists of the ball-roll path and the ball-return path, in which the balls move endlessly. A plural number of separators are arranged between the balls respectively in order to prevent balls from contacting each other. A number of the balls is fewer from one ball to three balls than a maximum number of the balls which can be contained into the circulation path.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 6 are views of a deflector used for the ball screw mechanism, which

FIG. 7 are views of a separator used for the ball screw mechanism, which

DESCRIPTION OF THE PREFERRED EMBODIMENT

An electric power steering apparatus 10 as an embodiment of the present invention and a ball screw mechanism 26 that is adopted to the electric power steering apparatus will be described with reference to FIGS. 1–8.

Figure 1:
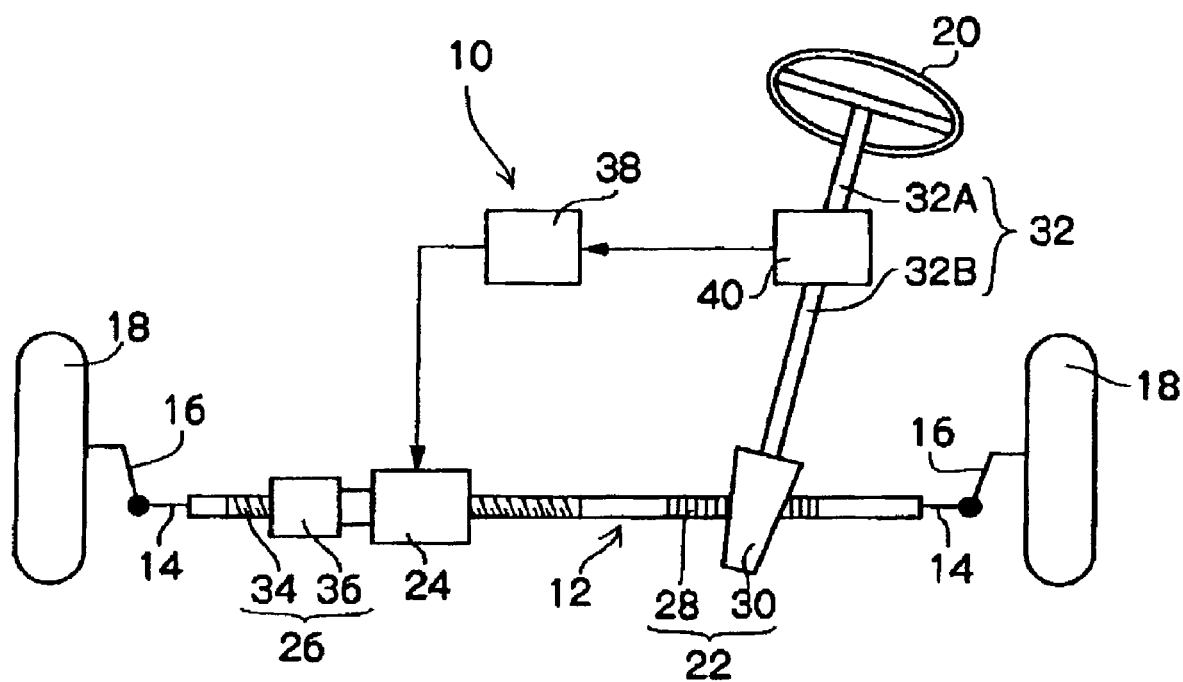
FIG. 1 is a schematic view of a part of a vehicle that equips an electric power steering apparatus as an embodiment of the present invention.

FIG. 1 shows a schematic view of a part of a vehicle that the power steering apparatus 10 is equipped with. The electric power steering apparatus 10 comprises a rack shaft 12 that is arranged so that its longitudinal direction is the width direction of the vehicle. Each end of the rack shaft 12 is connected to wheels 18 which is steered via a tie rod 14 and a knuckle arm 16, so that the wheels 18 are steered according to the axial movement of the rack shaft 12. The rack shaft 14 is moved in the axial direction by a rack-and-pinion mechanism 22 and a ball screw mechanism 26. The rack-and-pinion mechanism 22 transmits steering torque that is inputted through a steering wheel 20 to the rack shaft 14. The ball screw mechanism 26 transmits assist torque that is generated by an electric motor 24 such as a brushless DC motor.

The rack-and-pinion mechanism 22 comprises a rack 28 that is formed on one side of the rack shaft 14 and a pinion 30 that is engaged with the rack 28. The pinion 30 is connected to the steering wheel 20 via a steering shaft 32. When the pinion 30 is rotated by the steering torque from the steering wheel 20, the rack shaft 14 whose the rack 28 is engaged with the pinion 30 is moved in axial direction. That is, the rack-and-pinion mechanism 22 transforms the steering torque to steering effort that moves the rack shaft 14 in the axial direction.

Meanwhile, the ball screw mechanism 26 comprises a thread groove 34 that is formed on the other side of the rack shaft 14, plural balls 70 and a ball-screw nut 36 (hereinafter "nut") that is engaged with the thread grooves 34 via the balls and connected to the electric motor 24. When the nut 36 is rotated by the assist power supplied from the electric motor 24, the rack shaft 14 whose thread grooves 34 are engaged with nut 36 is moved in the axial direction. That is, the ball screw mechanism 26 transforms the assist torque to assist-steering effort that assists to move the rack shaft 14 in the axial direction. Detailed construction of the ball screw mechanism 26 will be explained after.

The electric motor 24 is electrically connected with control circuit 38. The control circuit 38 is electrically connected with a torque sensor 40 that detects the steering torque generated according to operation of the steering wheel 20. The torque sensor 40 is arranged between an input shaft 32A and an output shaft 32B that construct the steering shaft 32, and detects the steering torque based on relative angle displacements between the input shaft 32A and the output shaft 32B (or absolute angle displacements of each shaft). The control circuit 38 makes the electric motor 24 generate the assist torque whose quantity and direction correspond to the steering torque detected by the torque sensor 40.

Figure 2:
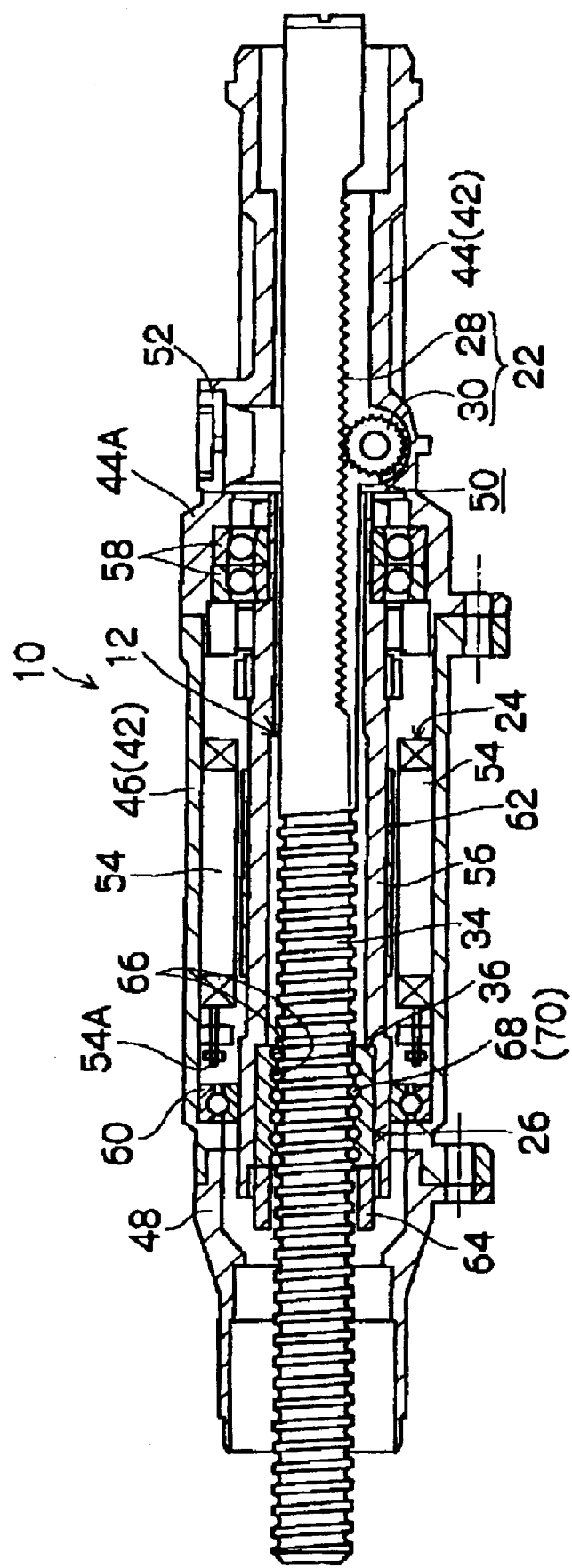
FIG. 2 is a cross-sectional view of the electric power steering apparatus.

As shown by FIG. 2, the rack shaft 12 is inserted into a housing 42 which contains the rack-and-pinion mechanism 22, the electric motor 24 and the ball screw mechanism 26. The housing 42 is assembled as a single tube so that a rack housing 44, tube-yoke housing 46 and an end housing 48 that are formed as a cylindrical-shape respectively are connected coaxially each other (for example, by bolts). The housing 42 is fixed to the vehicle via brackets (not shown). The rack housing 44 is located in a side corresponding to the rack 28 of the rack shaft 12 and comprises a pinion chamber 50 that contains the pinion 30 engaged with the rack 28. The pinion 30 that is in the pinion chamber 50 is rotatably supported by bearings (not shown). A rack guide 52 is attached with the rack housing 44 so that a spring (not shown) disposed between the rack housing 44 and the rack guide 52 presses the back of the rack shaft 12 toward the pinion 30 in order to keep engagement between the rack 28 and the pinion 30.

The tube-yoke housing 46 is located in the center of the housing 42. An armature core 54 is attached on an inside surface of the middle of the tube-yoke housing 46. The armature core 54 has plural tooth at an inside surface. The armature core 54 constructs a coil by being wound up the tooth. Current is supplied to the coil via terminals 54A. A cylindrical-shaped (hollow) motor shaft 56 is disposed into the coil. The motor shaft 56 is supported by bearings 58, 60 rotatably relative to the housing 42 under a state that the rack shaft 12 penetrates into the motor shaft 56. A ring-shaped permanent magnet 62 is attached on periphery surface of the motor shaft 56 so as to be opposed to the coil. When the current is supplied to the coil via the terminals 54A, magnetic paths are created into the motor shaft 56 and the motor shaft 56 is rotated. The aforementioned tube-yoke housing 46, the coil (the armature core 54, the terminals 54A), the motor shaft 56, the ring-shaped permanent magnet 62 and the bearings 58, 60 construct the electric motor 24, which can be rotated in normal and reversal according to control commands from the control circuit 38.

The end housing 48 is connected with the tube-yoke housing 46 at the end of opposite side of the rack housing 44. One end of the motor shaft 56 is inserted into the end housing 48. The nut 36 that constructs the ball screw mechanism 26 is fitted into one end of the end housing side of the motor shaft 56 and is locked by a lock nut 64 to avoid the nut falling out. Therefore, the nut 36 is rotated together with the motor shaft 56.

Figure 3:
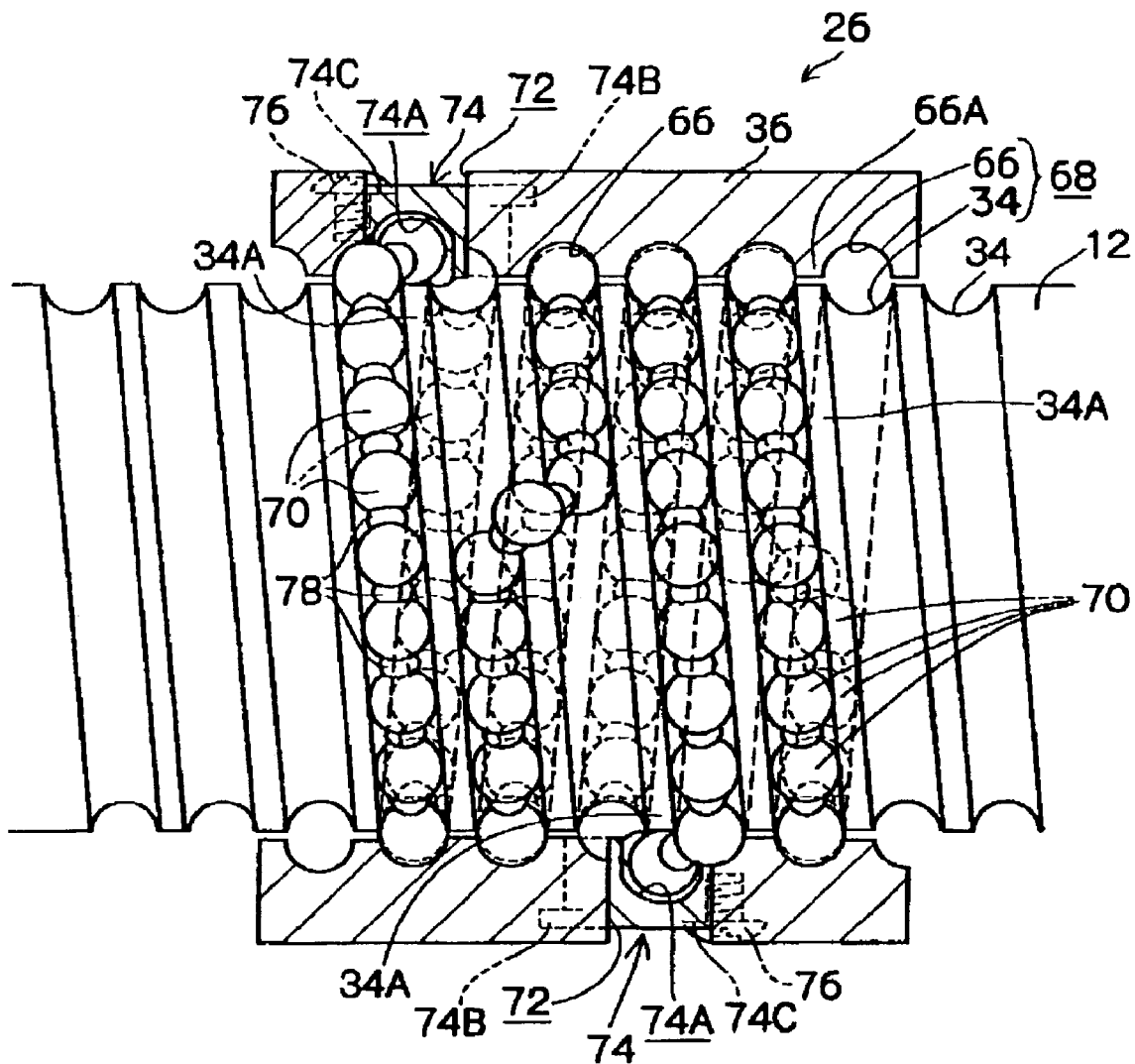
FIG. 3 is a cross-sectional view of a ball screw mechanism installed in the electric power steering apparatus.
Figure 4:
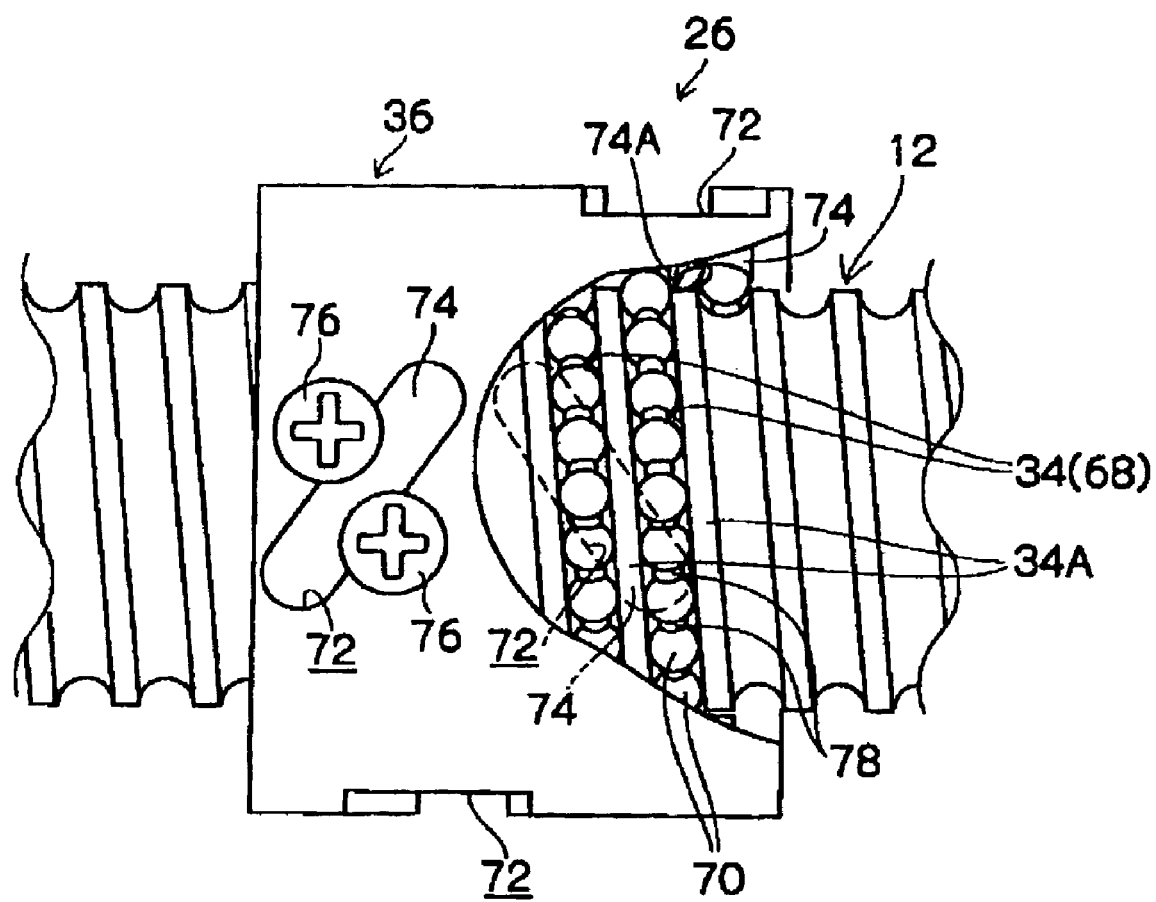
FIG. 4 is a fragmentary sectional view of the ball screw mechanism.
Figure 5:
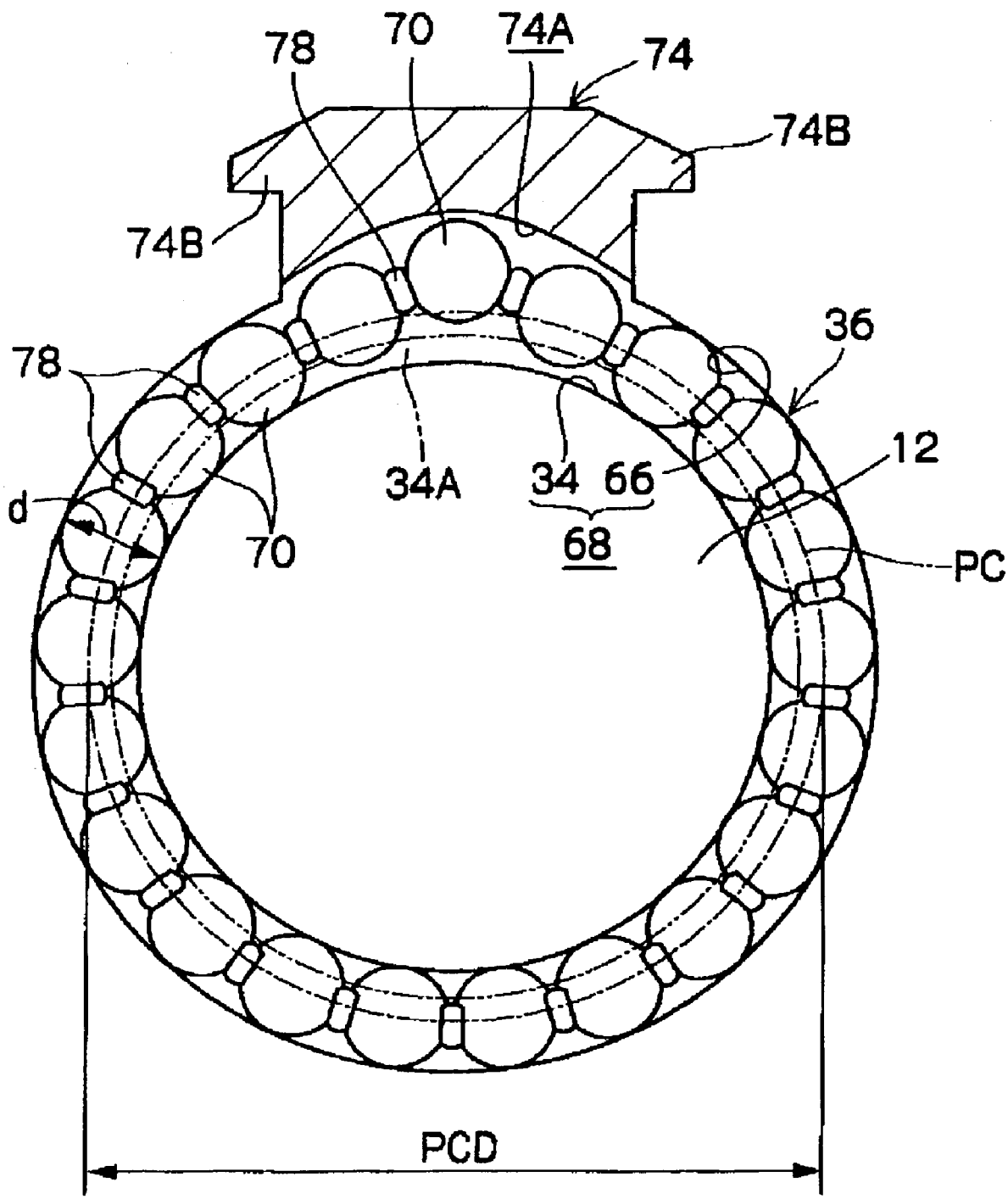
FIG. 5 is a projected view in the axial direction of a circulation path of the ball screw mechanism.
Figure 6A:
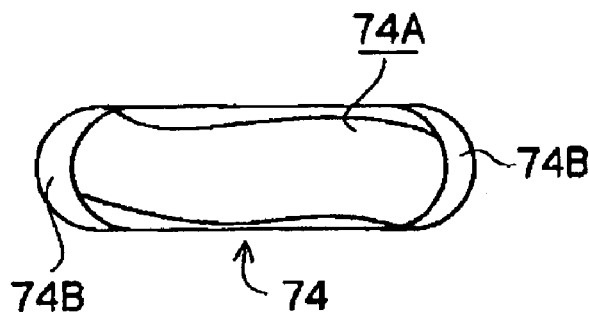
FIG. 6(A) is a plane view.
Figure 6B:
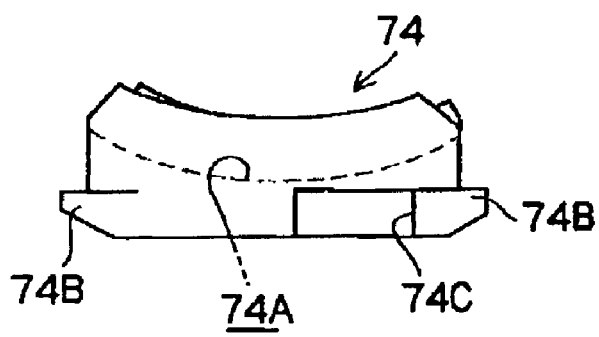
FIG. 6(B) is a front view.
Figure 6D:
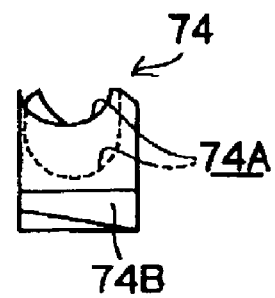
FIG. 6(C) is a bottom view and FIG. 6(D) is a side view.
Figure 6C:
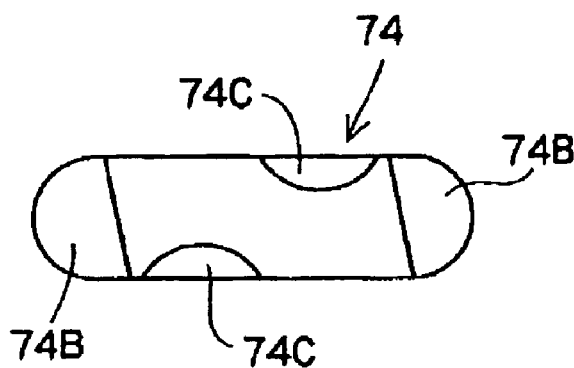

Details of the ball screw mechanism 26 will be explained hereinafter. As shown by FIG. 3, spiral ball-roll paths 68 are created so that the thread grooves 34 of the rack shaft 12 oppose to thread grooves 66 that are formed on an inside surface of the nut 36. Plural balls 70 that receive load are contained to be able to roll themselves into the ball-roll paths 68. That is, nut 36 is engaged with the rack shaft 12 through the balls 70. Plural fitting apertures 72 are formed on the nut 36, which goes through the nut 36 in radial direction and carves a part of a ridge 66A of the thread groove 66 out in the circumferential direction. As shown by FIG. 4, each fitting aperture 72 is an oval-shaped slot that is slanted relative to the axial direction of the nut 36, and disposed so as to step over a ridge 34A of the thread groove 34. Four fitting apertures 72 are arranged so as to have equal intervals (phase differences by ninety degrees) each other in the circumferential direction and be shifted each other in the axial direction. A deflector 74 is attached into each fitting aperture 72. As shown by FIG. 6, the deflector is formed to be fitted into the fitting aperture 72. A circulation slot 74A whose width corresponds to the diameter of the ball 70 is formed on the inside surface of the deflector 74. The circulation slot 74A is formed to be curved like S-shape in its longitudinal direction, and to be deeper in a center portion than sides portion thereof in the longitudinal direction so that the balls 70 can pass between the circulation slot 74A and a ridge 34A of the thread groove 34. A ball-return path that connects both ends of the ball-roll path 68 in axial direction so as to step over the ridge 34A is created by attaching the deflector 74 into the fitting aperture 72. Therefore, the balls 70 can be endlessly cycled into the ball-roll path 68 and the ball-return path. A pair of protrusions 74B is formed on the opposite side of the circulation slot 74A at the both ends of the deflector 74 in its longitudinal direction. A pair of arc notches 74C is also formed on the opposite side of the circulation slot 74A. Each deflector 74 is fixed into the fitting aperture 72 by a pair of screws 76 whose head engages to the arc notch 74C under a state that the protrusions 74B are fitted to steps (not shown) formed on the fitting aperture 72 (see FIG. 4). The ball-screw mechanism 26 has four circulation paths that consist of the ball-roll path 68 and the ball-return path, in which the balls 70 cycle endlessly by relative rotation of the rack shaft 12 and the nut 36 (see FIG. 3). Each length of the circulation path is approximately spiral one round. Since the deflectors 74 are arranged with equal intervals in the circumferential direction, any unbalance does not occur when the nut 36 rotates.

Number N of the balls 70 contained into each circulation path is decided so as to be fewer from one to three (one, two or three) than maximum number of the balls which can be contained into the circulation path. That is, the number of the balls 70 is fewer from one to three than a quotient A that is divided a length L of the circulation path by a diameter of the ball 70 (the quotient A is rounded down, i.e. when it is defined that $L=A \times d+b$ and $0 \leq b < d$, b/d that is fractions are rounded down). As a way to decide the number N of the balls 70, the length L of the circulation path is approximated as a circumferential length of a pitch circle PC that is obtained by projecting the circulation path in the axial direction. That is, when a diameter of the pitch circle PC is expressed by PCD, $L \approx \pi \times PCD$. Therefore, the number N of the balls 70 is decided by a following expression: $N = \pi \times PCD/d - C$ ($1 \leq C \leq 3$, fractions below decimal point is rounded down.) Now, since the circulation path is a spiral and comprises the ball-return path, actual the length L of the circulation path is slightly longer than the approximated length.

Figure 7A:
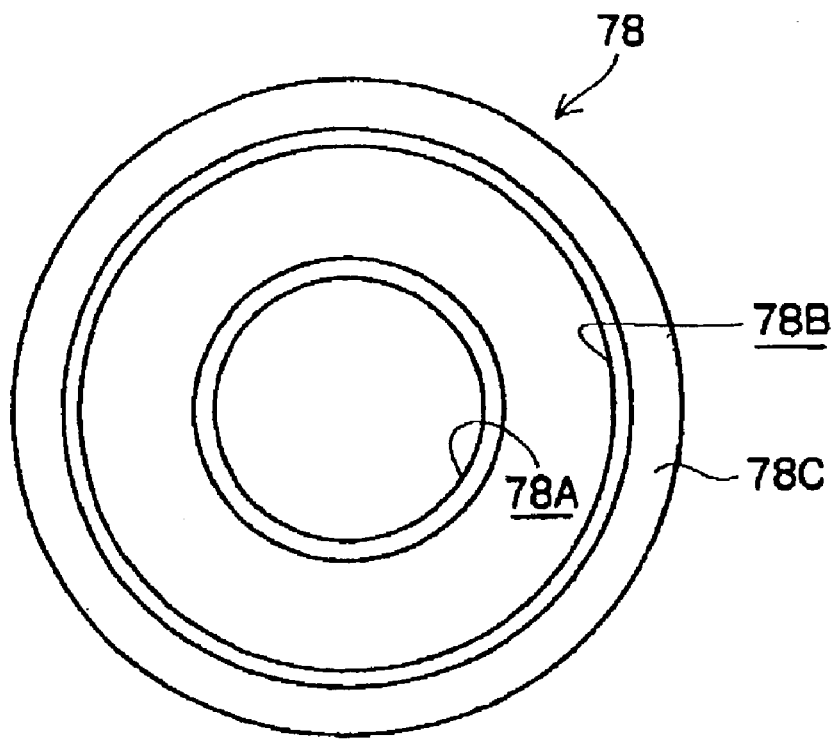
FIG. 7(A) is a plane view and FIG. 7(B) is a cross-sectional view.
Figure 7B:
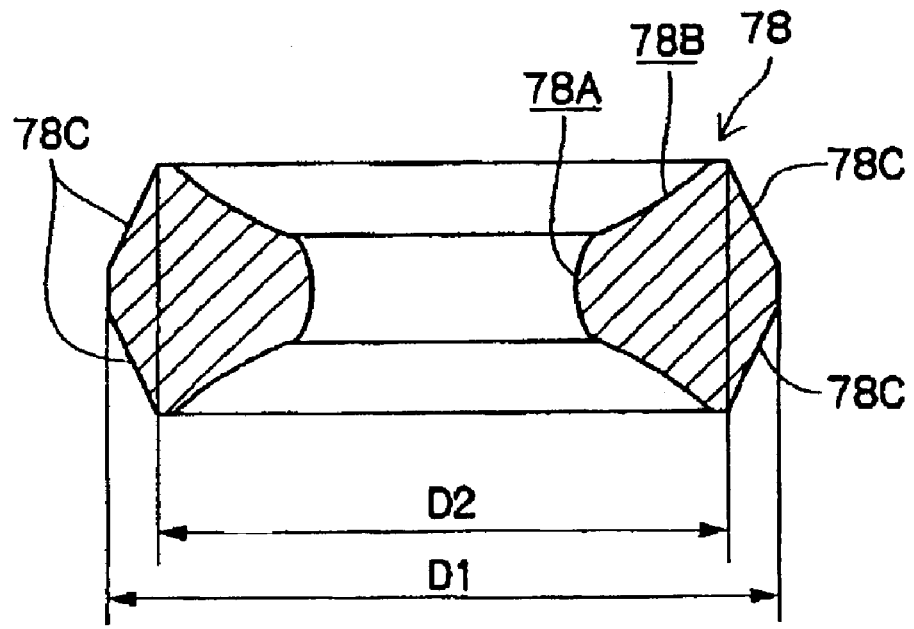
Figure 8:
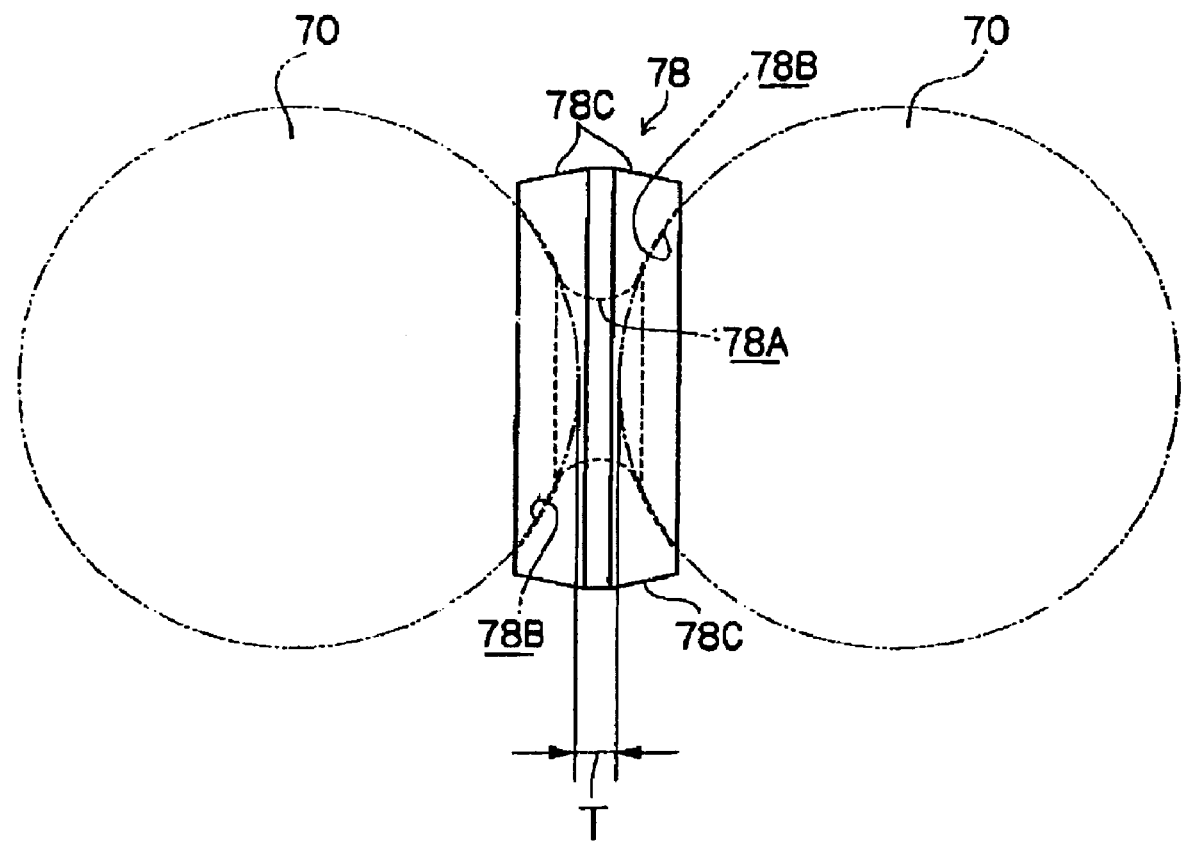
FIG. 8 is a schematic view showing a relationship between the separator and balls.

Separators 78 preventing that balls 70 contact each other are arranged between each balls 70. Therefore, number of the separator 78 is same as the number of the ball 70. As shown by FIG. 7(A) and FIG. 7(B), each separator 78 is a ring shape that has a through hole 78A in the center thereof. A concavity 78B that a part of the ball 70 is slidably inserted into is formed at each end face of the separator 78. A surface of the concavity 78B is a sphere (or a taper) that is complemented with the ball 70 and continues to the through hole 78A. Therefore, the separator 78 can be held by the balls 70 that are located at both sides thereof because the part of the ball 70 gets into the concavity 78B. Meanwhile, outer surface of the separator 78 is chamfered so that diameters of the separator 78 are gradually decreased from the center to the ends thereof in the axial direction. That is, the chamfered outer surface 78C of the separator 78 is straight (or continuous) in its cross-sectional view. A proportion R (=D1/D2) of a maximum diameter D1 at the center and a minimum diameter D2 at the ends is defined so as to be in a range from 0.8 to 0.9, i.e. $0.8 \leq R \leq 0.9$. Diameter of inner edge of the concavity 78B is also defined so that a proportion of the diameter of inner edge of the concavity 78B and the diameter of the ball 70 is in a range from 0.6 to 0.8. As shown by FIG. 8, a width T of the separator 78 is defined as a minimum distance between two balls that sandwich the separator 78. When it is considered that each width T is equal, the width T is provided as a quotient that a difference that a length which balls occupy is subtracted from the length of circulation path is divided by the number of the separator 78. That is, $T=(\pi \times PCD - dN)/N$. The width T correspond a clearance that is created between the balls 70 under an assumption that the balls 70 are arranged on the pitch circle PC at equal intervals.

According to the above described electric power steering apparatus, when a driver operates the steering wheel 20, the steering torque that occurs by the steering operation of the driver is transformed to the steering force which moves the rack shaft 12 in the axial direction by the rack-and-pinion mechanism 22, and the rack shaft is moved to the axial direction. Then, the torque sensor 40 detects the steering torque, and the control circuit 38 makes the electric motor 24 generate assist torque corresponding to the detected steering torque. The assist torque is transformed to the assist power to assist axial movement of the rack shaft 12 by the ball screw mechanism 26. Therefore, the steering operation of the driver lightens. Then, the nut 36 is turned by the electric motor 24 relative to the rack shaft 26 in the ball screw mechanism 26. The balls 70 of N number in each circulation path roll themselves and move endlessly through the circulation path that comprises the ball-roll path 68 and ball-return path while receiving load. But the balls that are in the ball-return path do not receive the load. Since the balls 70 next to each other do not contact because of the separator 78, each ball 70 can roll smoothly without obstructing rolling of each other.

Because all separators 78 have same width, i.e. only one kind of the separator 78 is used for the ball screw mechanism 26, parts management of the separators 78 is simply and number of assembling process is decreased Further, the length L of the circulation path that is obtained by the approximation is shorter than the actual length, because the circulation path is spiral and the balls 70 take a roundabout in the ball-return path, even if there is some error caused by dimensional accuracy of the thread grooves 34, 66. Therefore, significantly small clearance is created between each ball 70 and each separator 78 (concavity 78B) whose width T is decided as above. Proper width of the clearance between the balls 70 and the separator 78 can be created using the one kind of separator 78. That is, the separators 78 can be held between the balls 70 without falling down and, it is guaranteed that the balls 70 roll smoothly without unnecessary sliding between the balls 70 and the separator 67. Furthermore, the separator that is assembled last can be inserted between the first assembled ball and the last assembled ball. That is, a clearance created by pushing all the balls 70 and all the separator 67 except the last assembled separator to one side is larger than the width T of the separator 78.

In addition, since only from one to three balls 70 are removed to insert the separators 78, i.e. the number N of the balls 70 is close to the maximum number of the balls 70 which can be contained into the circulation path, it is significantly prevented to decrease load capacity of the ball screw mechanism 26 by using the separators 78 in comparison with a ball screw mechanism which does not have separators.

The separator 78 has the chamfered outer surface in the aforementioned embodiment. Therefore, even if there is a step at a seam between the ball-roll path 68 and the ball-return path, the separators 78 do not catch on the step, because the separators 78 can climb over the step by existence of the chamfered outer surface. As a result, it is achieved that the separators 78 move in the circulation path smoothly. Further, since the chamfered outer surface 78C is formed so that the proportion R is in a range from 0.8 to 0.9, it is possible to form the chamfered outer surface 78C without increasing the diameter of the separator 78. That is, the portion of minimum diameter D2 can be formed at outer side of the concavity 78B which the part of the balls 70 is inserted into. Furthermore, such straight chamfered surface can be machined more easily than a spherical chamfer.

The electric power steering apparatus 10 can achieve low cost and significant operation failure prevention because of using the aforementioned ball screw mechanism 26. As an application of the ball screw mechanism 26, it is preferable to be used for the electric power steering apparatus 10, but the ball screw mechanism 26 can be used for other applications that need to transform rotational movement to linear movement or linear movement to rotational movement such as machine tools.

Figure 9:
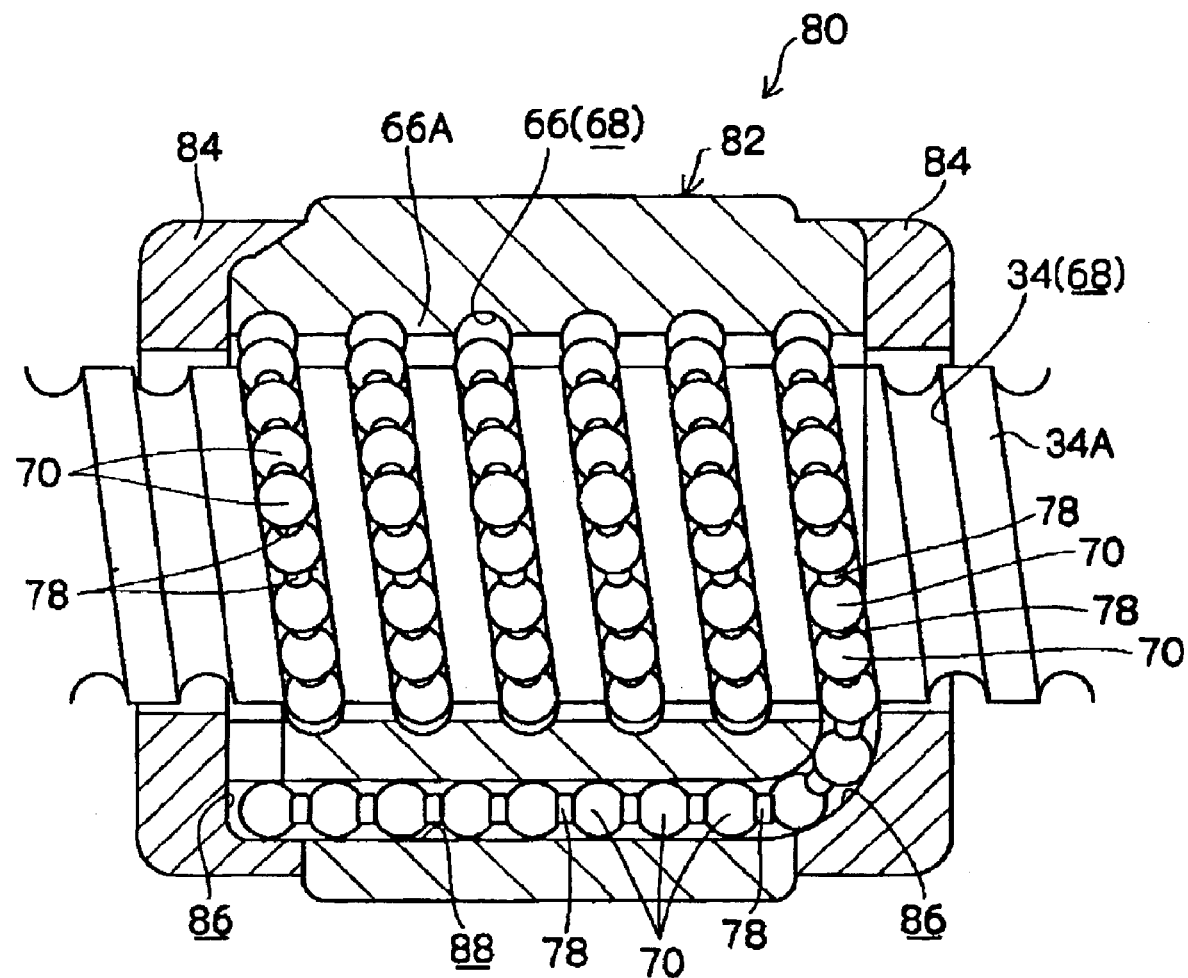
FIG. 9 is a cross-sectional view of a ball screw mechanism as a modification of the embodiment.

Meanwhile, at an application that the nut 36 is not turned, the present invention can be applied to another type of ball screw mechanism 80 which is so called a end-cap type. As a modification of the embodiment, the end-cap type ball screw mechanism 80 will be described with reference to FIG. 9. Differences with the aforementioned ball screw mechanism 26 are explained, and explanations for other constructions are omitted. A couple of end caps 84 is attached at both ends of a nut 82. A ball-guide groove 86 is formed into each end cap 84. The ball-guide grooves 86 are connected via a ball-return path 88 which is formed into the nut 82 along the axial direction. That is, only one circulation path is created at this ball screw mechanism 86. Since the nut 82 has weight unbalance in the rotational direction, it is preferable that the ball screw mechanism 86 is used for the application that a shaft is turned instead of the nut 86.

Obviously, numerous modifications and variations of the present invention are possible in light of the above teachings. It is thereby to be understood that within the scope of the appended claims, the present invention may be practiced otherwise than as specifically described herein.

What is claimed is:

1. A ball screw mechanism to transform from rotational movement into linear movement and from linear movement into rotational movement comprising:

a shaft formed with a screw groove on an outer surface thereof, wherein turns of the screw groove are separated by a step;

a nut formed with a screw groove on an inner surface thereof;

a ball-roll path created spirally by the turns of the screw groove of the shaft and the screw groove of the nut being opposite each other;

a plural number of balls contained in the ball-roll path;

a ball-return path comprising a deflector that deflects a ball in the ball-roll path over the step from one turn to an adjacent turn to form a circulation path comprising the ball-roll path and the ball-return path, in which the balls move endlessly; and a plural number of separators of equal width arranged between the balls respectively in order to prevent balls from contacting each other;

wherein a number of the balls is fewer from one ball to three balls than a maximum number of the balls which can be contained into the circulation path, and wherein a width of the separators is equal to a clearance between the balls which are next to each other when the balls are located at equal intervals, wherein an outer surface of each separator is chamfered so that a proportion of a maximum diameter at the center of the axial direction of the separator and a minimum diameter at the ends of the axial direction of the separator is in a range from 0.8 to 0.9.

2. A ball screw mechanism according to claim 1, wherein the maximum number of the balls is calculated based on a length of the circulation path and a diameter of the balls.

3. A ball screw mechanism according to claim 2, wherein the length of the circulation path is approximated as a circumferential length of a pitch circle which is obtained by projecting the circulation path in the axial direction.

4. A ball screw mechanism according to claim 1, wherein each separator has a concavity at each end thereof, in which a part of the ball is inserted.

5. An electric power steering apparatus to generate assist power according to steering torque comprising:

a shaft formed with a rack on a part thereof and a screw groove on another part thereof, wherein turns of the screw groove are separated by a step, respectively;

a pinion engaged with the rack shaft, which the steering torque is inputted in;

an electric motor controlled to generate the assist power according to the steering torque;

a nut formed with a screw groove on an inner surface thereof, which is rotated by the electric motor;

a ball-roll path created spirally by the turns of the screw groove of the shaft and the screw groove of the nut being opposite each other;

a plural number of balls contained in the ball-roll path;

a ball-return path comprising a deflector that deflects a ball in the ball-roll path over the step from one turn to an adjacent turn to form a circulation path comprising the ball-roll path and the ball-return path, in which the balls move endlessly; and a plural number of separators of equal width arranged between the balls respectively in order to prevent balls from contacting each other;

wherein a number of the balls is fewer from one ball to three balls than a maximum number of the balls which can be contained into the circulation path, and wherein a width of the separators is equal to a clearance between the balls which are next to each other when the balls are located at equal intervals, wherein an outer surface of each separator is chamfered so that a proportion of a maximum diameter at the center of the axial direction of the separator and a minimum diameter at the ends of the axial direction of the separator is in a range from 0.8 to 0.9.

\* \* \* \* \*